US012512616B2

(12) United States Patent
Nishijima

(10) Patent No.: US 12,512,616 B2
(45) Date of Patent: Dec. 30, 2025

(54) CONNECTOR WITH NESTED SPRING MEMBERS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 18/035,899

(22) PCT Filed: Nov. 5, 2021

(86) PCT No.: PCT/JP2021/040747

§ 371 (c)(1),
(2) Date: May 8, 2023

(87) PCT Pub. No.: WO2022/113697

PCT Pub. Date: Jun. 2, 2022

(65) Prior Publication Data

US 2023/0402779 A1 Dec. 14, 2023

(30) Foreign Application Priority Data

Nov. 24, 2020 (JP) ................................ 2020-194637

(51) Int. Cl.
*H01R 13/18* (2006.01)
*H01R 13/187* (2006.01)

(52) U.S. Cl.
CPC ....... *H01R 13/187* (2013.01); *H01R 2201/26* (2013.01)

(58) Field of Classification Search
CPC .............................. H01R 13/187; H01R 13/18
(Continued)

(56) References Cited

U.S. PATENT DOCUMENTS 4,583,812 A * 4/1986 Gross, Jr. ............... H01R 13/18 439/839
5,007,865 A * 4/1991 Jakobeit ................. H01R 13/18 439/856

(Continued)

OTHER PUBLICATIONS

International Search Report issued on Dec. 28, 2021 for WO 2022/113697 A1 (4 pages).

*Primary Examiner* — Phuong K Dinh
(74) *Attorney, Agent, or Firm* — Venjuris, P.C.

(57) ABSTRACT

A second terminal (14) of a second connector is provided with a first spring member (23) including a pair of first spring pieces (26) facing each other, and a second spring member (24) including a pair of second spring pieces (41) for sandwiching the pair of first spring pieces (26). The pair of second spring pieces (41) apply pressing forces to the pair of first spring pieces (26) in mutually approaching directions. A first terminal (13) of a first connector is sandwiched by the pair of first spring pieces (26), whereby the first terminal (13) and the first spring member (23) are electrically connected. The second spring member (24) includes a stopper portion (45) for restricting displacements of the pair of first spring pieces (26) in the mutually approaching directions by contacting the pair of first spring pieces (26).

4 Claims, 7 Drawing Sheets

(58) Field of Classification Search
USPC .......................................... 439/857, 839, 251
See application file for complete search history.

(56) References Cited

U.S. PATENT DOCUMENTS

| | | | | |
|---|---|---|---|---|
| 5,094,636 | A | 3/1992 | Zinn et al. | |
| 5,947,777 | A * | 9/1999 | Chaillot ............... | H01R 13/113<br>439/852 |
| 8,113,087 | B2 * | 2/2012 | Arnold ................... | B62K 21/26<br>74/551.9 |
| 2001/0049237 | A1 | 12/2001 | Saka et al. | |
| 2015/0038000 | A1 | 2/2015 | Glick et al. | |
| 2020/0403342 | A1 | 12/2020 | Nishijima | |

* cited by examiner

CONNECTOR WITH NESTED SPRING MEMBERS

CROSS REFERENCE TO RELATED APPLICATIONS

This application is a national phase of PCT application No. PCT/JP2021/040747, filed on 5 Nov. 2021, which claims priority from Japanese patent application No. 2020-194637, filed on 24 Nov. 2020, all of which are incorporated herein by reference.

TECHNICAL FIELD

The present disclosure relates to a connector.

BACKGROUND

A conventional connector for vehicle is described in Patent Document 1. This connector is provided with a first connector including a first terminal and a second connector including a second terminal to be connected to the first terminal. The second terminal includes a pair of connecting portions facing each other. The first terminal is inserted into between the pair of connecting portions of the second terminal to contact the respective connecting portions. In this way, the first and second terminals are electrically connected.

PRIOR ART DOCUMENT

PATENT DOCUMENT

Patent Document 1: JP 2019-153565 A

SUMMARY OF THE INVENTION

Problem to be Solved

The present inventor has studied how to suppress an insertion force in inserting a first terminal into between a pair of connecting portions in a connector as described above. If the insertion force is too large, assemblability in assembling the first and second connectors is deteriorated.

Accordingly, it is aimed to provide a connector capable of improving the assemblability of first and second connectors.

Means to Solve the Problem

The present disclosure is directed to a connector with a first connector including a first terminal and a second connector including a second terminal to be connected to the first terminal, the second terminal including a first spring member having a pair of first spring pieces facing each other and a second spring member having a pair of second spring pieces for sandwiching the pair of first spring pieces, the pair of second spring pieces applying pressing forces to the pair of first spring pieces in mutually approaching directions, the first terminal being sandwiched by the pair of first spring pieces, whereby the first terminal and the first spring member are electrically connected, and the second spring member including a stopper portion for restricting displacements of the pair of first spring pieces in the mutually approaching directions by contacting the pair of first spring pieces.

Effect of the Invention

According to the present disclosure, it is possible to provide a connector capable of improving the assemblability of first and second connectors.

DETAILED DESCRIPTION TO EXECUTE THE INVENTION

Description of Embodiments of Present Disclosure

Figure 1:
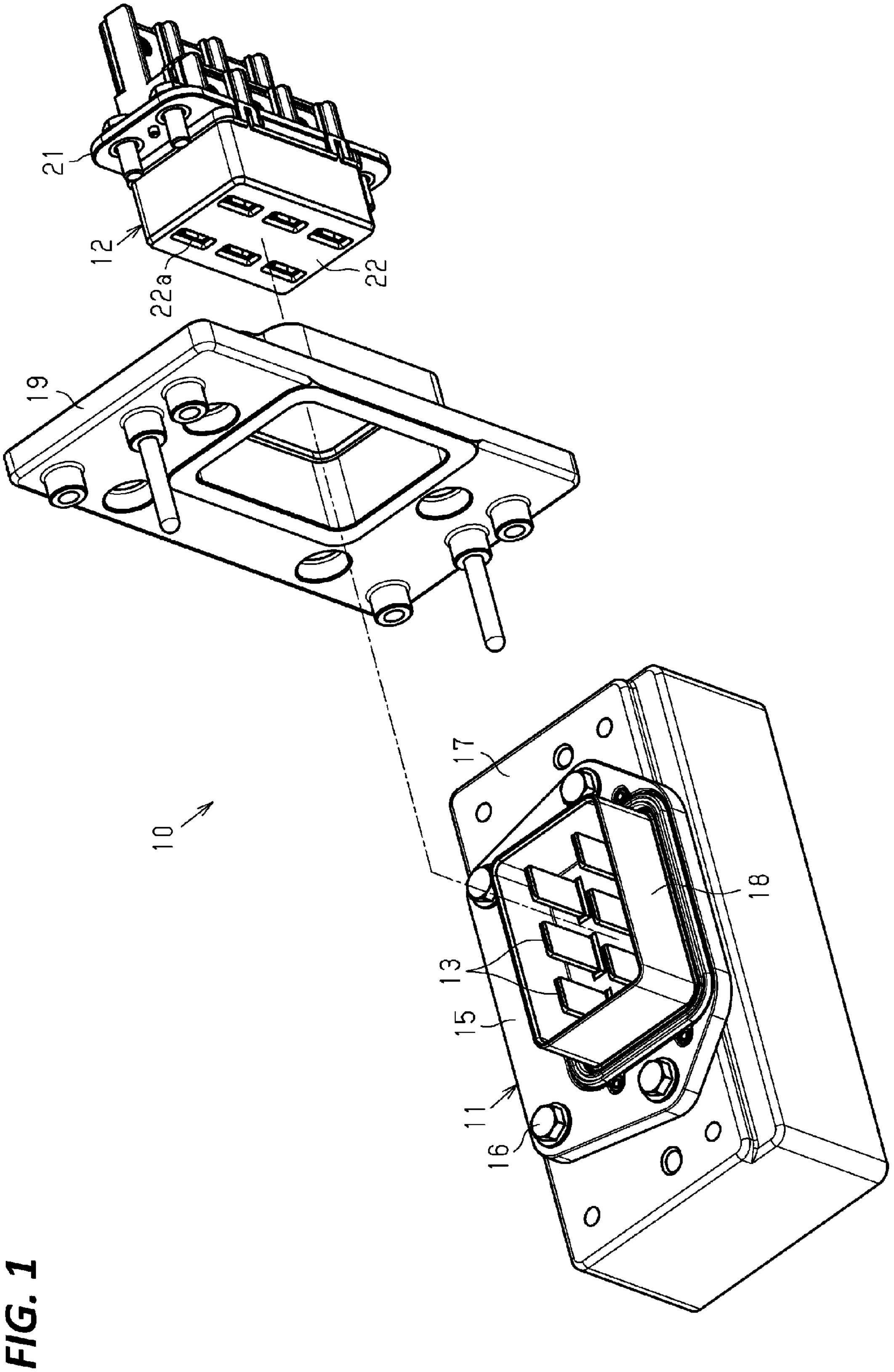
FIG. 1 is an exploded perspective view of a connector of an embodiment.

First, embodiments of the present disclosure are listed and described.

[1] The connector of the present disclosure is provided with a first connector including a first terminal and a second connector including a second terminal to be connected to the first terminal, the second terminal including a first spring member having a pair of first spring pieces facing each other and a second spring member having a pair of second spring pieces for sandwiching the pair of first spring pieces, the pair of second spring pieces applying pressing forces to the pair of first spring pieces in mutually approaching directions, the first terminal being sandwiched by the pair of first spring pieces, whereby the first terminal and the first spring member are electrically connected, and the second spring member including a stopper portion for restricting displacements of the pair of first spring pieces in the mutually approaching directions by contacting the pair of first spring pieces.

According to this configuration, in a non-inserted state of the first terminal, the pair of first spring pieces can be held not to contact each other by the stopper portion of the second spring member. In this way, an excessive increase of an insertion force in inserting the first terminal into between the pair of first spring pieces can be suppressed, with the result that the assemblability of the first and second connectors can be improved.

[2] The second spring member includes a coupling portion coupling the pair of second spring pieces, the coupling portion includes through holes having the stopper portions on edge parts, and the first spring pieces are inserted in the through holes.

According to this configuration, the displacements of the respective first spring pieces in the mutually approaching directions can be restricted by the contact of the first spring pieces with the edge parts of the through holes serving as the stopper portions. In this configuration, the displacements of the first spring pieces can be restricted by a simple configuration of only inserting the first spring pieces into the through holes.

[3] Each first spring piece includes a bent portion bent such that the respective first spring pieces are convex in the mutually approaching directions, each first spring piece contacts the first terminal on a convex side of the bent portion, each second spring piece includes a pressing portion to be fit into a concave side of the bent portion, and each pressing portion applies the pressing force to the bent portion.

According to this configuration, the pressing portion can be positioned with respect to the first spring piece by fitting the pressing portion of the second spring piece into the concave side of the bent portion. Further, the pressing portion of the second spring piece is positioned by the bent portion in contact with the first terminal. Thus, a spring force of the second spring piece can be suitably applied to the first terminal.

[4] The first spring piece includes a plurality of first divided spring pieces, the second spring piece includes a plurality of second divided spring pieces to be respectively brought into contact with the plurality of first divided spring pieces, each first divided spring piece is in contact with the first terminal, and each second divided spring piece applies the pressing force to the first divided spring piece in contact therewith.

According to this configuration, each first divided spring piece and each second divided spring piece can be individually displaced according to a relative position shift of the first terminal in a rotating direction about an axis along the inserting direction. In this way, even if the first terminal is shifted in position in the rotating direction, a reduction in a contact pressure of each first spring piece with the first terminal can be maximally suppressed.

Details of Embodiment of Present Disclosure

A specific example of a connector of the present disclosure is described below with reference to the drawings. Some of components may be shown in an exaggerated or simplified manner for the convenience of description in each figure. Further, a dimension ratio of each part may be different in each figure. Further, "orthogonal" in this specification means not only strictly orthogonal, but also substantially orthogonal within a range in which functions and effects in this embodiment are achieved. Further, examples of a "flat plate shape" in this specification include shapes with chamfered corner parts and ridge parts, shapes with rounded corner parts and ridge parts, and shapes formed with irregularities in a part or the entirety of a surface constituting the shape. Further, a "tube" used in the description of this specification means not only a tube formed with a peripheral wall continuous over an entire periphery in a circumferential direction, but also a tube constituted by combining a plurality of components or a tube including a cut or the like in a part in the circumferential direction such as a C shape. Further, examples of a "tubular" shape include circular tubular shapes, elliptical tubular shapes and polygonal tubular shapes with pointed or round corners.

As shown in FIG. 1, a connector 10 of this embodiment is provided with a first connector 11 and a second connector 12. The first connector 11 includes first terminals 13. The second connector 12 includes second terminals 14 shown in FIG. 2. With the first and second connectors 11, 12 coupled to each other, the first terminals 13 and the second terminals 14 are connected to each other.

The first connector 11 shown in FIG. 1 is, for example, provided in a first in-vehicle device. This first in-vehicle device is, for example, a travel drive motor in an electric vehicle, a hybrid vehicle or the like. The second connector 12 is, for example, provided in a second in-vehicle device to be connected to the first in-vehicle device. This second in-vehicle device is, for example, a power control unit for controlling the drive of the travel drive motor. The first and second connectors 11, 12 are high voltage connectors.

Note that an X axis, out of XYZ axes orthogonal to each other in figures, is along a width direction of the connector 10. Further, the Y axis is along a depth direction of the connector 10. Further, the Z axis is along a front-rear direction of the connector 10. In the following description, a direction along the X axis, that along the Y axis and that along the Z axis are respectively referred to as an X-axis direction, a Y-axis direction and a Z-axis direction.

Configuration of First Connector 11

Figure 3:
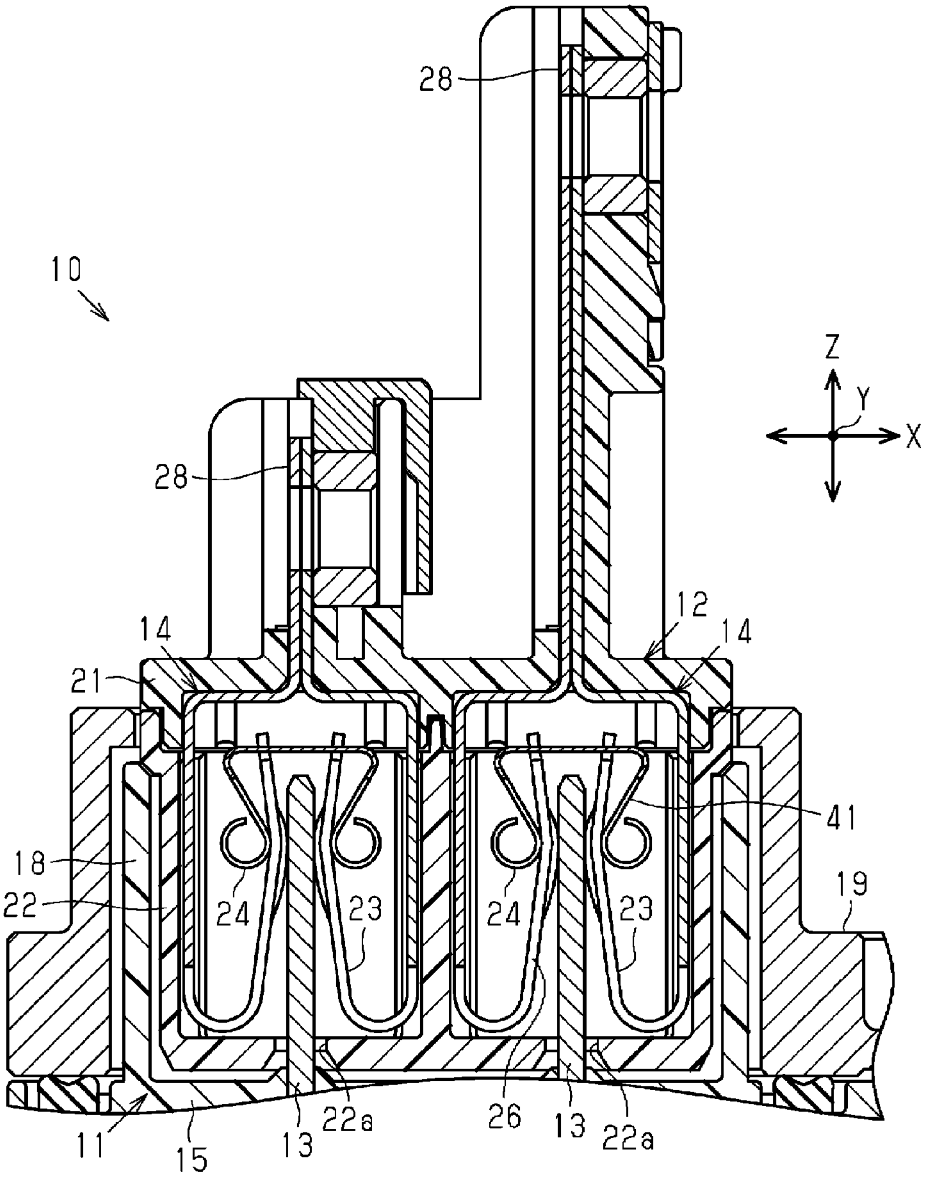
FIG. 3 is a section of the connector in the embodiment.

As shown in FIGS. 1 and 3, the first connector 11 is provided with a first housing 15 for holding the first terminals 13. The first housing 15 is, for example, constituted by an insulator made of synthetic resin or the like. The first housing 15 is, for example, fixed to a base portion 17 by a plurality of screws 16 shown in FIG. 1. Tip parts of the first terminals 13 held in the first housing 15 are exposed from the first housing 15. The first terminal 13 has, for example, a flat plate shape. The first terminal 13 is so provided that plate surfaces thereof are orthogonal to the X-axis direction. A plurality of first terminals 13 are a total of six first terminals 13 provided in two rows in the X-axis direction and in three rows in the Y-axis direction. Further, a plurality of the first terminals 13 are provided. The first housing 15 includes a peripheral wall 18 for surrounding the exposed parts of the plurality of first terminals 13.

Configuration of Second Connector 12

Figure 2:
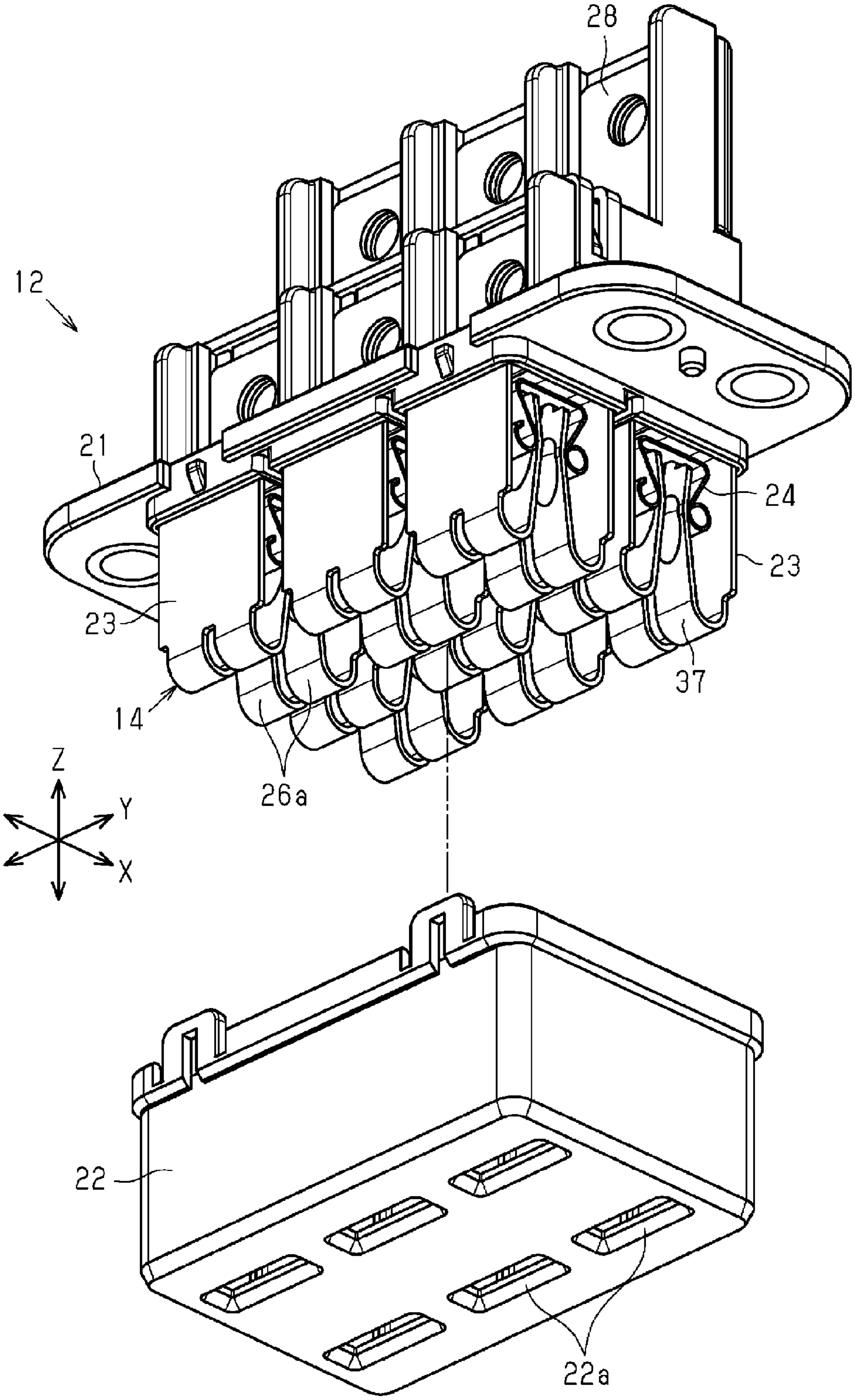
FIG. 2 is an exploded perspective view of a second connector in the embodiment.

As shown in FIGS. 2 and 3, the second connector 12 is provided with a second housing 21 for holding the second terminals 14 and a cover 22 assembled with the second housing 21. The cover 22 covers parts of the second terminals 14. The cover 22 is attachable to and detachable from the second housing 21. The cover 22 includes openings 22*a*, through which the first terminals 13 are inserted. The second housing 21 is fixed to a mounting member 19 shown in FIG. 3. The mounting member 19 is fixed to the base portion 17. That is, the second housing 21 is supported on the base portion 17 via the mounting member 19.

Configuration of Second Terminal 14

Figure 4:
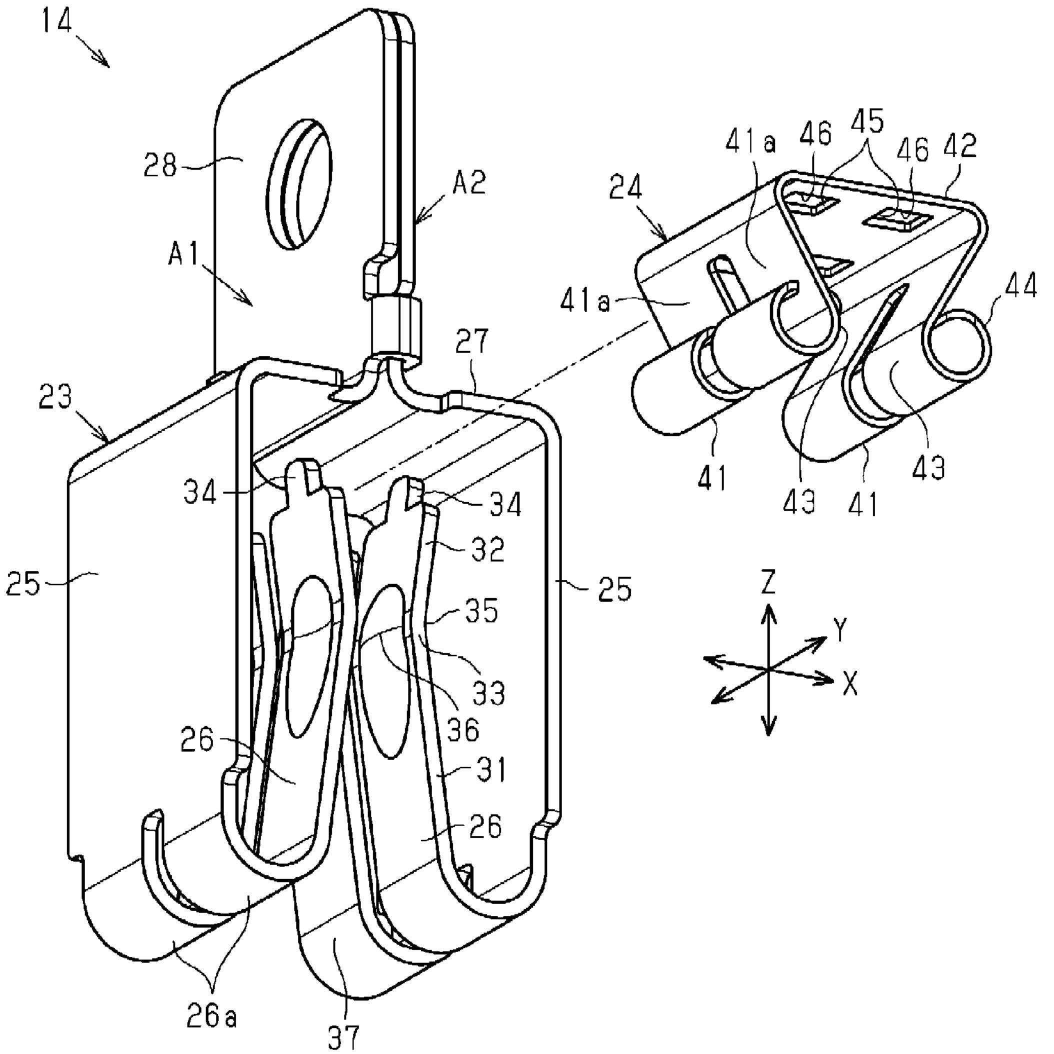
FIG. 4 is an exploded perspective view of a second terminal in the embodiment.
Figure 5:
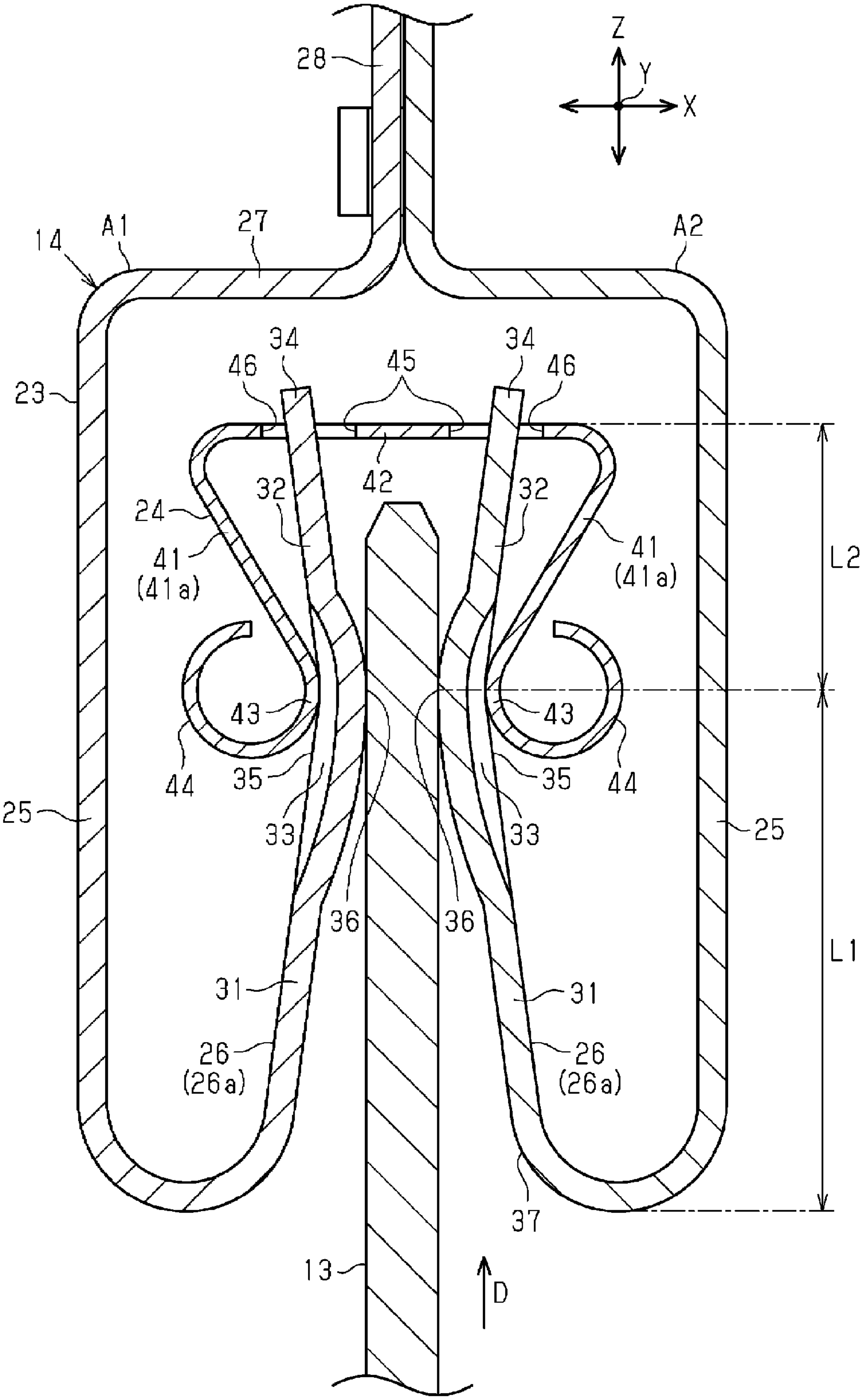
FIG. 5 is a section of a first terminal and the second terminal in the embodiment.

As shown in FIGS. 4 and 5, the second terminal 14 includes a first spring member 23 and a second spring member 24. The second spring member 24 is mounted into the first spring member 23. The second spring member 24 is, for example, supported only in the first spring member 23. That is, the second spring member 24 is, for example, not in contact with anything other than the first spring member 23.

Configuration of First Spring Member 23

The first spring member 23 is, for example, formed by press-working a metal plate. The first spring member 23 constitutes electrical contact points with the first terminal 13. Thus, the first spring member 23 is constituted by a conductor. A constituent material of the first spring member 23 is, for example, a copper or silver-based metal.

The first spring member 23 includes a pair of supporting portions 25, a pair of first spring pieces 26, a coupling portion 27 and a connecting portion 28.

The pair of supporting portions 25 are facing each other in the X-axis direction. The coupling portion 27 couples the pair of supporting portions 25 to each other. The pair of supporting portions 25 extend, for example, along the Z-axis direction from the coupling portion 27. The first spring piece 26 extends from each of the pair of supporting portions 25. Each first spring piece 26 is located between the pair of supporting portions 25. The pair of first spring pieces 26 are facing each other in the X-axis direction.

The connecting portion 28 extends from the coupling portion 27. The connecting portion 28 extends, for example, to a side opposite to a side where the supporting portions 25 are provided. The connecting portion 28 extends, for example, along the Z-axis direction. The connecting portion 28 is connected to an unillustrated terminal of the second in-vehicle device. The connecting portion 28 extends, for example, from a central part in the X-axis direction of the coupling portion 27. Further, the supporting portions 25 respectively extend from both end parts in the X-axis direction of the coupling portion 27. In the coupling portion 27, a length from the connecting portion 28 to one supporting portion 25 and that from the connecting portion 28 to the other supporting portion 25 are, for example, set to be equal.

The pair of supporting portions 25 have, for example, the same shape. Further, the pair of first spring pieces 26 have, for example, the same shape. The supporting portion 25 includes a base end part, which is one end part in the Z-axis direction, and a tip part, which is the other end part in the Z-axis direction. The base end part of the supporting portion 25 is connected to the coupling portion 27. The tip part of the supporting portion 25 is connected to the first spring piece 26. The first spring piece 26 extends from the tip part of the supporting portion 25 toward the coupling portion 27. The first spring piece 26 is formed by folding the tip part of each supporting portion 25 inwardly. That is, the first spring piece 26 includes a base end part connected to the supporting portion 25 and a tip part, which is an open end. The respective first spring pieces 26 are biased in mutually approaching directions by the resilience of the second spring member 24.

Configuration of First Spring Pieces 26

Each first spring piece 26 includes a first inclined portion 31, a second inclined portion 32, a bent portion 33 and an engaging protrusion 34.

The bent portions 33 are formed by bending parts in the Z-axis direction of the first spring pieces 26 to be convex in the mutually approaching directions. The bent portion 33 is bent when viewed from the Y-axis direction. The first inclined portion 31 is, for example, a part of the first spring piece 26 from the base end part to the bent portion 33. The second inclined portion 32 is, for example, a part of the first spring piece 26 from the bent portion 33 to the tip part. The bent portion 33 is formed between the first and second inclined portions 31, 32. In the Z-axis direction, a length of the first inclined portion 31 is set to be longer than that of the second inclined portion 32. In other words, the bent portion 33 is provided closer to the tip side than a center in the Z-axis direction in the first spring piece 26.

The respective first inclined portions 31 are facing each other in the X-axis direction. The respective first inclined portions 31 are inclined to approach each other toward the tip sides of the first spring pieces 26. The respective second inclined portions 32 are inclined to separate from each other toward the tip sides of the first spring pieces 26. The engaging protrusion 34 is provided on the tip part of each first spring piece 26. The engaging protrusion 34 is, for example, formed to have a narrower width than the tip part of the second inclined portion 32.

The bent portion 33 is an angled portion formed by the first and second inclined portions 31, 32. The respective bent portions 33 project inwardly of the pair of first spring pieces 26. That is, convex sides in the respective bent portions 33 are sides approaching each other, and concave sides are back sides. A recess 35 is formed on the back side of the bent portion 33, which is the angled portion formed by the first and second inclined portions 31, 32.

A contact portion 36 to be brought into contact with the first terminal 13 is provided on a top part of the convex side of each bent portion 33. The respective contact portions 36 are formed, for example, by deforming parts of the respective bent portions 33 to be dented toward the sides approaching each other. In the respective first spring piece 26, the respective contact portions 36 are provided at the same position in the Z-axis direction. The pair of first spring pieces 26 are closest to each other at the respective contact portions 36.

Note that the first spring member 23 is, for example, composed of two components. These two components are a first component A1 and a second component A2. Each of the first and second components A1, A2 is formed, for example, by press-working a metal plate. Each of the first and second components A1, A2 includes a part of the coupling portion 27, one supporting portion 25 and one first spring piece 26. Further, the first and second components A1, A2 are bonded to each other at the connecting portion 28.

As shown in FIG. 2, a plurality of the second terminals 14 are, for example, provided. The number of the second terminals 14 provided in the second connector 12 is equal to that of the first terminals 13 provided in the first connector 11. The plurality of second terminals 14 are a total of six second terminals 14 provided in two rows in the X-axis direction and in three rows in the Y-axis direction.

As shown in FIG. 3, the second housing 21 supports side surfaces on the side of the connecting portion 28 in the coupling portion 27 of the first spring member 23. Further, the second housing 21 also supports outer side surfaces of the base end parts of the respective supporting portions 25.

As shown in FIG. 5, the first terminal 13 is inserted into between the pair of first spring pieces 26. An inserting direction D of the first terminal 13 is, for example, along the Z-axis direction. A gap between the base end parts of the respective first inclined surfaces 31 constitutes an insertion opening 37 in inserting the first terminal 13 into the first spring member 23. The respective first inclined portions 31 are inclined with respect to the inserting direction D of the first terminal 13. The first terminal 13 is sandwiched by the pair of first spring pieces 26 while being inserted between the pair of first spring pieces 26. At this time, the contact portions 36 of the respective first spring pieces 26 are in contact with the first terminal 13. In this way, the first terminal 13 and the first spring pieces 26 are electrically connected.

Figure 6:
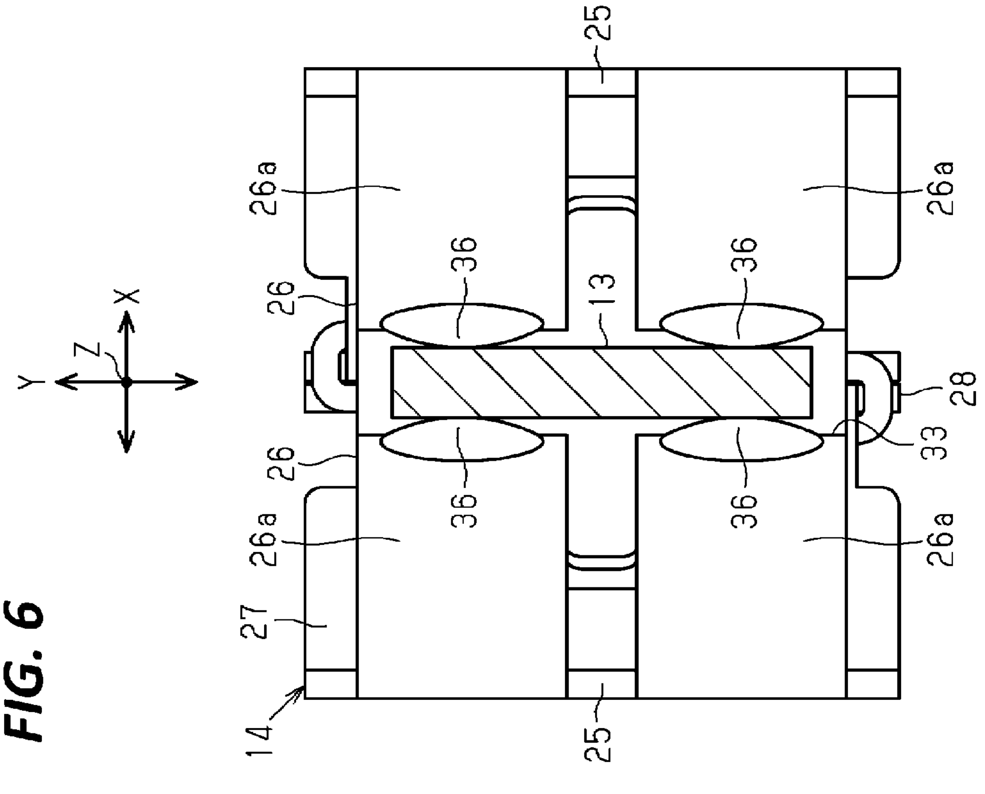
FIG. 6 is a diagram showing a connected state of the first and second terminals in the embodiment.

As shown in FIGS. 4 and 6, each first spring piece 26 includes, for example, a pair of first divided spring pieces **26*a*. In this embodiment, two first divided spring pieces 26*a*** extend from one supporting portion 25. That is, each first spring piece 26 includes two first divided spring pieces 26*a*, and one first spring member 23 includes four first divided spring pieces 26*a*. In each first spring piece 26, the first divided spring pieces 26*a* are provided side by side in the Y-axis direction. Each first divided spring piece 26*a* has the configuration of the aforementioned first spring piece 26, i.e. includes a first inclined portion 31, a second inclined surface 32, a bent portion 33 having a recess 35 and a contact portion 36, and an engaging protrusion 34.

Configuration of Second Spring Member

The second spring member 24 is held on the tip parts of the pair of first spring pieces 26. The second spring member 24 is formed, for example, by press-working a metal plate. Note that the second spring member 24 does not constitute an electrical circuit in the connector 10. Thus, a material difficult to conduct electricity and an insulator can be used as a constituent material of the second spring member 24. The constituent material of the second spring member 24 is, for example, a stainless steel.

As shown in FIGS. 4 and 5, the second spring member 24 includes a pair of second spring pieces 41 and a coupling portion 42 coupling the pair of second spring pieces 41 to each other. Each second spring piece 41 extends from the coupling portion 42. The second spring piece 41 has a base end part connected to the coupling portion 42 and a tip part, which is an open end on a side opposite to the base end part. The respective second spring pieces 41 are facing each other. The respective second spring pieces 41 are, for example, inclined in mutually approaching directions toward tip sides. Note that the respective second spring pieces 41 are formed, for example, by bending both end parts in the X-axis direction of the coupling portion 42. The pair of second spring pieces 41 generate spring forces in the mutually approaching directions.

The second spring member 24 is mounted to sandwich the pair of first spring pieces 26 by the pair of second spring pieces 41. The second spring member 24 includes pressing portions 43 on tip parts of the respective second spring pieces 41. Each second spring piece 41 includes, for example, a tubular portion 44 tubular when viewed from the Y-axis direction on the tip part of the second spring piece 41. The tubular portion 44 is, for example, formed with a gap in a part in the circumferential direction like a C shape. The tubular portion 44 has an arcuate shape when viewed from the Y-axis direction.

In assembling the second spring member 24 with the first spring pieces 26, unillustrated rod-like jigs are inserted into the tubular portions 44 of the respective second spring pieces 41. An interval between the second spring pieces 41 is widened by these rod-like jigs and, in that state, the pair of first spring pieces 26 are arranged between the pair of second spring pieces 41.

In each second spring piece 41, the pressing portion 43 is a part in the circumferential direction. That is, the pressing portion 43 of this embodiment has an arcuate shape when viewed from the Y-axis direction. The pressing portion 43 is fit into the recess 35 of each first spring piece 26. The respective pressing portions 43 apply pressing forces to the respective bent portions 33 in the mutually approaching directions. That is, the respective second spring pieces 41 press the bent portions 33 of the first spring pieces 26 in the mutually approaching directions by the pressing portions 43.

Further, the pressing portion 43 contacts the first inclined portion 31 on one side in the Z-axis direction and contacts the second inclined portion 32 on the other side in the Z-axis direction. That is, the second spring member 24 is positioned in the Z-axis direction by fitting the pressing portions 43 into the recesses 35.

As shown in FIG. 5, a length L2 from the base end part of the second spring piece 41 to the contact portion 36 is set to be shorter than a length L1 from the base end part of the first spring piece 26 to the contact portion 36 in the Z-axis direction, i.e. a direction along the inserting direction D of the first terminal 13.

As shown in FIG. 4, each second spring piece 41 includes, for example, a plurality of second divided spring pieces 41*a*. The second divided spring pieces 41*a* are provided to respectively correspond to the plurality of first divided spring pieces 26*a*. That is, as many second divided spring pieces 41*a* as the first divided spring pieces 26*a* are provided. Each second spring piece 41 includes, for example, two second divided spring pieces 41*a* arranged in the Y-axis direction. Each second divided spring piece 41*a* has the configuration of the aforementioned second spring piece 41, i.e. includes a tubular portion 44 having a pressing portion 43. The respective second divided spring pieces 41*a* contact the respective first divided spring pieces 26*a*. The respective second divided spring pieces 41*a* apply pressing forces to the first divided spring pieces 26*a* in contact therewith in the mutually approaching directions.

In assembling the second spring member 24 with the first spring member 23, the rod-like jigs are inserted into the tubular portions 44 of the respective second divided spring pieces 41*a* arranged in the Y-axis direction in the respective second spring pieces 41. Then, an interval between the respective second divided spring pieces 41*a* is widened by these rod-like jigs and the pairs of first divided spring pieces 26*a* are arranged between the pairs of second divided spring pieces 41*a* facing each other.

As shown in FIGS. 4 and 5, the coupling portion 42 includes stopper portions 45 for restricting displacements of the respective first spring pieces 26. The stopper portions 45 restrict displacements of the respective first spring pieces 26 in the mutually approaching directions by contacting the engaging protrusions 34.

The coupling portion 42 is, for example, in the form of a flat plate extending along a plane orthogonal to the Z axis. The coupling portion 42 includes, for example, through holes 46 penetrating through the coupling portion 42 in the Z-axis direction. The engaging protrusions 34 are inserted into the through holes 46. The stopper portions 45 are edge parts of the through holes 46. One second spring member 24 has as many through holes 46 as the first divided spring pieces 26*a* of one first spring member 23. In this embodiment, each second spring member 24 is provided with four through holes 46. In each second spring member 24, the respective engaging protrusions 34 are inserted in the respective through holes 46.

Functions of this embodiment are described.

Figure 7:
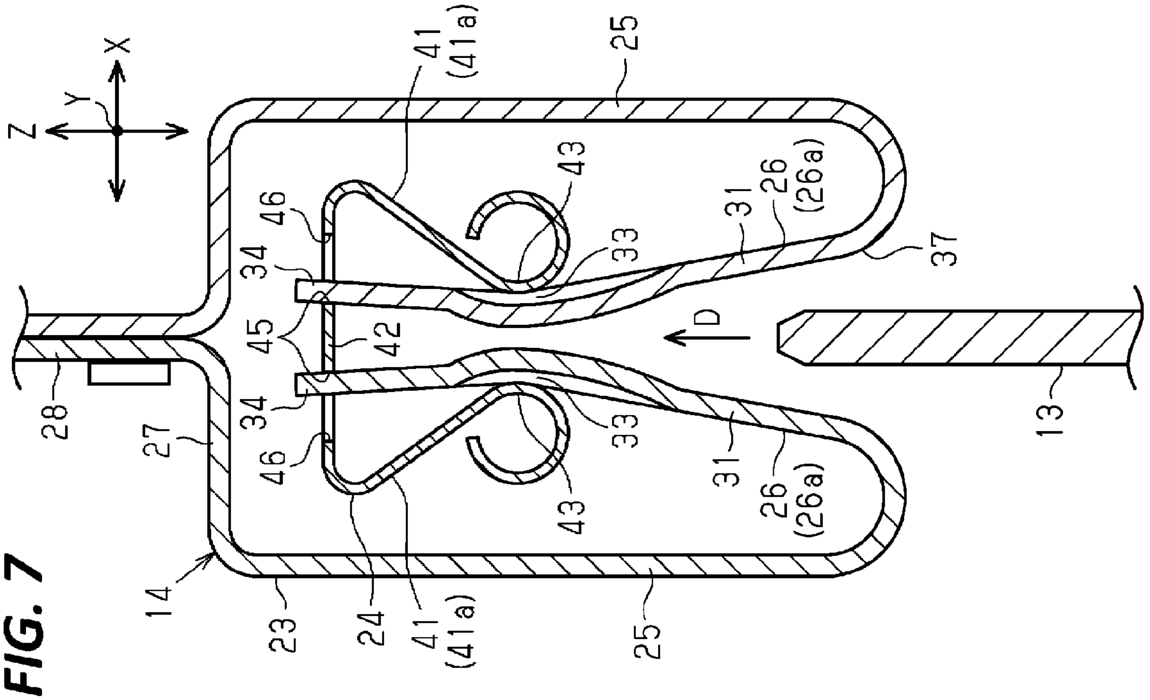
FIG. 7 is a section showing an assembling state of the first and second terminals in the embodiment.

FIG. 7 shows the second terminal 14 in a non-inserted state of the first terminal 13. In this non-inserted state, the pair of first spring pieces 26 facing each other in the X-axis direction are biased in the mutually approaching directions by spring forces of the pair of second spring pieces 41. In this non-inserted state, the engaging protrusions 34 of the respective first divided spring pieces 26*a* are caught by the respective stopper portions 45. That is, the respective stopper portions 45 restrict displacements in the X-axis direction of the respective first divided spring pieces 26*a* biased in the mutually approaching directions by the respective second divided spring pieces 41*a*. In this way, in the non-inserted state, the pairs of first divided spring pieces 26*a* facing each other in the X-axis direction are not in contact with each other. That is, a gap is secured between the pairs of first divided spring pieces 26*a* facing each other in the X-axis direction.

In inserting the first terminal 13 into the second terminal 14, the tip part of the first terminal 13 contacts the first inclined portions 31 of the respective first spring pieces 26. Then, the first terminal 13 is inserted in the inserting direction D while pushing the pair of first spring pieces 26 outward apart from each other in the X-axis direction by the inclination of the first inclined portions 31. At this time, a gap is secured between the pair of first spring pieces 26 facing each other in the X-axis direction by the stopper portions 45. In this way, the respective first inclined portions 31 are kept at a small inclination angle with respect to the inserting direction D in the pair of first spring pieces 26. Thus, an insertion force can be reduced when the first terminal 13 is inserted while pushing the respective first inclined portions 31 wider apart.

Figure 8:
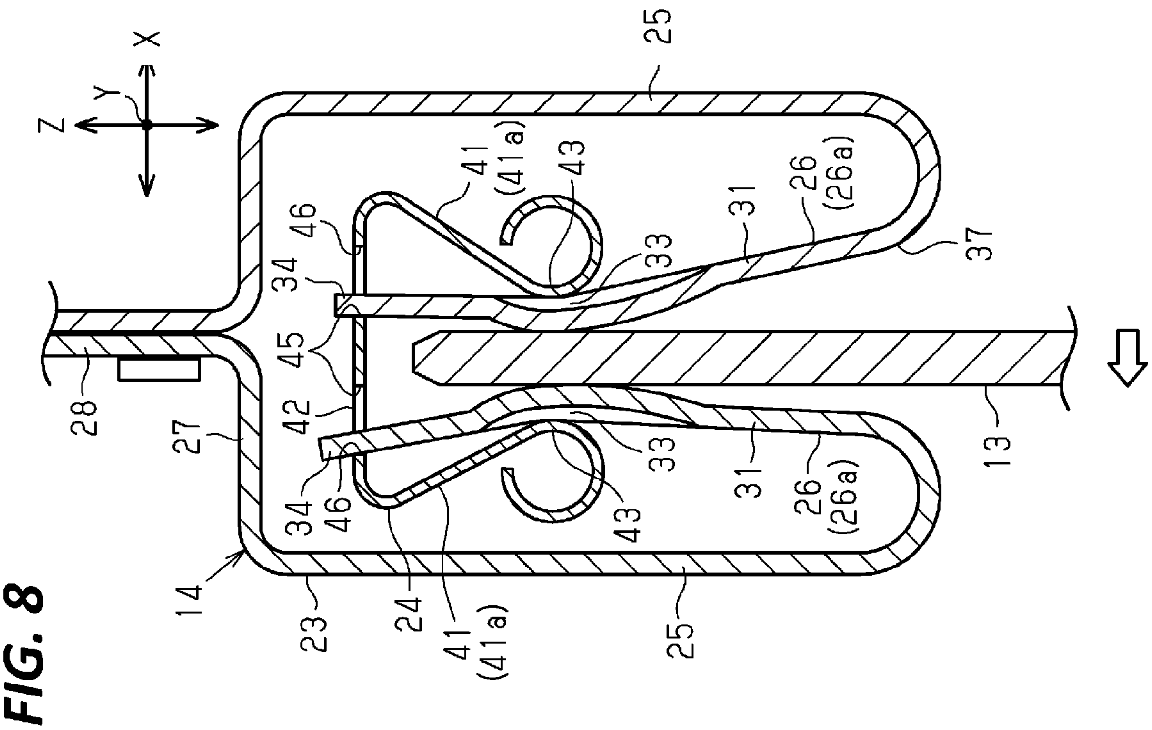
FIG. 8 is a section showing an effect of the connector in the embodiment.

The first and second terminals 13, 14 may be shifted in position, for example, in the X-axis direction due to manufacturing tolerances between the first and second connectors 11, 12. FIG. 8 shows a state where the first terminal 13 is relatively shifted in position with respect to the second terminal 14 in the X-axis direction. At this time, the pair of first spring pieces 26 facing each other in the X-axis direction are displaced in the X-axis direction according to the position shift of the first terminal 13. Then, the second spring member 24 held on the pair of first spring pieces 26 is displaced in the X-axis direction according to displacements of the pair of first spring pieces 26. In this way, even if the first terminal 13 is relatively shifted in position in the X-axis direction, a sandwiching force of the second spring pieces 41 of the second spring member 24 to sandwich the pair of first spring pieces 26 changes as little as possible. Thus, the contact portions 36 of the respective first spring pieces 26 can be configured not to be separated from the first terminal 13 and further to change contact pressures of the contact portions 36 with the first terminal 13 as little as possible even if the first terminal 13 is relatively shifted in position in the X-axis direction.

Figure 9:
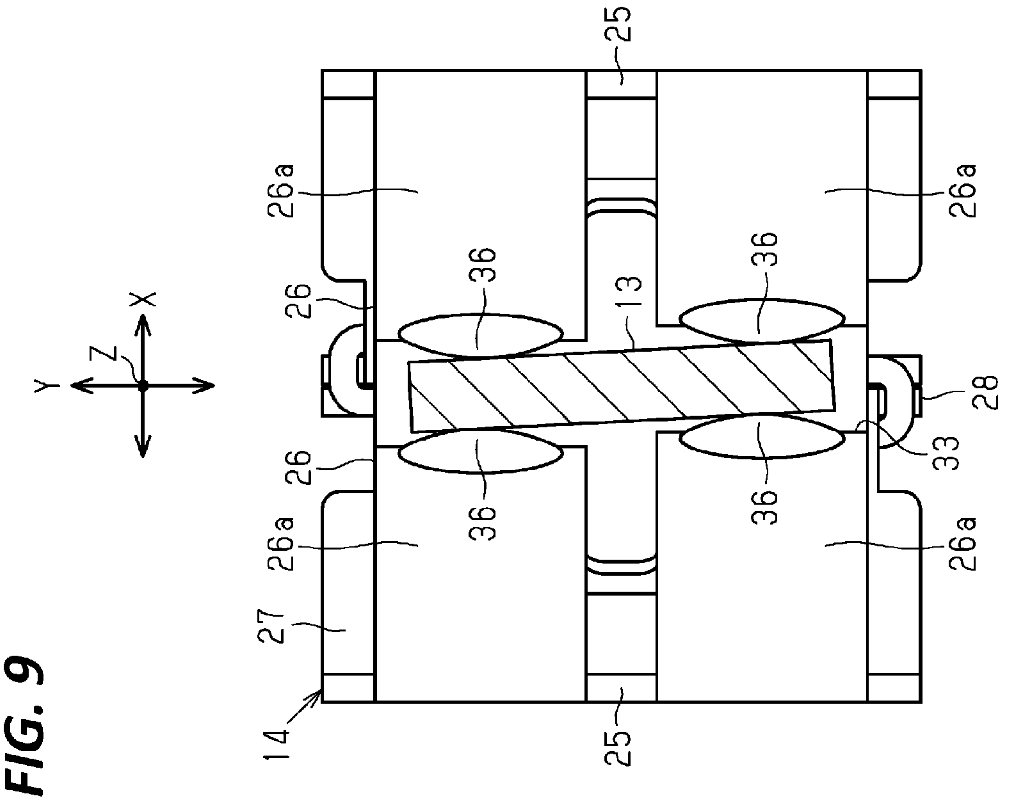
FIG. 9 is a diagram showing an effect of the connector in the embodiment.

Further, as shown in FIG. 9, the first terminal 13 may be relatively shifted in position in a rotating direction about an axis along the Z axis. Here, each first spring piece 26 is divided into two first divided spring pieces 26*a* arranged in the Y-axis direction. Further, each second spring piece 41 is divided into two second divided spring pieces 41*a* arranged in the Y-axis direction as shown in FIG. 4 to correspond to the respective first divided spring pieces 26*a*. Thus, as shown in FIG. 9, each first divided spring piece 26*a* and each second divided spring piece 41*a* can be individually displaced according to the position shift of the first terminal 13 in the rotating direction. Therefore, by the individual displacements of each first divided spring piece 26*a* and each second divided spring piece 41*a* according to the position shift of the first terminal 13 in the rotating direction, a reduction in the contact pressure of each first spring piece 26 with the first terminal 13 can be maximally suppressed even if the first terminal 13 is shifted in position in the rotating direction.

Effects of this embodiment are described.

(1) The second terminal 14 includes the first spring member 23 having the pair of first spring pieces 26 facing each other and the second spring member 24 having the pair of second spring pieces 41 for sandwiching the pair of first spring pieces 26. The pair of first spring pieces 26 are biased in the mutually approaching directions by the resilience of the second spring member 24. The pair of second spring pieces 41 apply pressing forces to the pair of first spring pieces 26 in the mutually approaching directions. By sandwiching the first terminal 13 by the pair of first spring pieces 26, the first terminal 13 and the first spring member 23 are electrically connected. The second spring member 24 includes the stopper portions 45 for restricting displacements of the pair of first spring pieces 26 in the mutually approaching directions by contacting the pair of first spring pieces 26.

According to this configuration, the pair of first spring pieces 26 can be held not to contact each other by the stopper portions 45 of the second spring member 24 in the non-inserted state of the first terminal 13. In this way, even if forces of the second spring pieces 41 are increased to obtain a large contact pressure of the first and second terminals 13, 14, an excessive increase of the insertion force in inserting the first terminal 13 into between the pair of first spring pieces 26 can be suppressed, with the result that the assemblability of the first and second connectors can be improved.

(2) The second spring member 24 includes the coupling portion 42 coupling the pair of second spring pieces 41 to each other. The coupling portion 42 includes the through holes 46 having the stopper portions 45 on the edge parts. The first spring pieces 26 are inserted into the through holes 46. According to this configuration, displacements of the respective first spring pieces 26 in the mutually approaching directions can be restricted by the contact of the first spring pieces 26 with the edge parts of the through holes 46 serving as the stopper portions 45. In this configuration, the displacements of the first spring pieces 26 can be restricted by a simple configuration of only inserting the first spring pieces 26 into the through holes 46.

(3) Each first spring piece 26 includes the bent portion 33 bent such that the respective first springs 26 are convex in the mutually approaching directions. Each first spring piece 26 contacts the first terminal 13 on the convex side of the bent portion 33. Each second spring piece 41 includes the pressing portion 43 to be fit into the concave side of the bent portion 33. Each pressing portion 43 applies a pressing force to the bent portion 33. According to this configuration, the pressing portion 43 of the second spring piece 41 can be positioned with respect to the first spring piece 26 by fitting the pressing portion 43 into the concave side of the bent portion 33. Further, the pressing portion 43 of the second spring piece 41 is positioned by the bent portion 33 in contact with the first terminal 13. Thus, a spring force of the second spring piece 41 can be suitably applied to the first terminal 13.

(4) The first spring piece 26 includes the plurality of first divided spring pieces 26*a*. The second spring piece 41 includes the plurality of second divided spring pieces 41*a* configured to respectively contact the plurality of first divided spring pieces 26*a*. Each first divided spring piece 26*a* is in contact with the first terminal 13. Each second divided spring piece 41*a* applies a pressing force to the first divided spring piece 26*a* in contact therewith. According to this configuration, each first divided spring piece 26*a* and each second divided spring piece 41*a* can be individually displaced according to a relative position shift of the first terminal 13 in the rotating direction about the axis along the inserting direction D. In this way, even if the first terminal 13 is shifted in position in the rotating direction, a reduction in the contact pressure of each first spring piece 26 with the first terminal 13 can be maximally suppressed.

(5) By sandwiching the first terminal 13 in the X-axis direction by the pair of first spring pieces 26 of the second terminal 14, contact points with the second terminal 14 are formed on both side surfaces in the X-axis direction of the first terminal 13. In this way, even if the first terminal 13 is relatively shifted in position in the Z-axis direction and Y-axis direction with respect to the second terminal 14, the first terminal 13 and the pair of first spring pieces 26 are stably connected without being separated.

The second spring member 24 is movable in the X-axis direction according to the position shift of the first terminal 13 in the X-axis direction with respect to the second terminal 14. Since the second spring member 24 moves in the X-axis direction according to the position shift in this way if the first terminal 13 is relatively shifted in position in the X-axis direction with respect to the second terminal 14, a contact pressure of the first terminal 13 and each first spring piece 26 can be secured without the contact portion 36 of each first spring piece 26 being separated from the first terminal 13.

That is, in the connector 10 of this embodiment, position shifts in the X-axis direction, Y-axis direction and Z-axis direction and a position shift in the rotating direction can be dealt with by the configuration of the second terminal 14 itself. Accordingly, in the connector 10 of this embodiment, it is not necessary to constitute a part of an electrical path by a flexible conductor such as a stranded wire or braided wire for absorbing the position shifts and make the housing for holding the terminals movable. Thus, the connector 10 of this embodiment can deal with the above position shifts while enabling the simplification of the configuration.

(6) The pressing portion 43 of each second spring piece 41 has an arcuate shape. In this way, even if the second spring member 24 moves in the X-axis direction as the first terminal 13 is shifted in position in the X-axis direction, each pressing portion 43 can be suitably brought into contact with each first spring piece 26.

(7) The length L2 from the base end part of the second spring piece 41 to the contact portion 36 is set to be shorter than the length L1 from the base end part of the first spring piece 26 to the contact portion 36 in the direction along the inserting direction D of the first terminal 13. According to this configuration, a spring force of the second spring piece 41 acting on the contact portion 36 is easily made larger than that of the first spring piece 26 acting on the contact portion 36. Therefore, the contact pressure of each first spring piece 26 with the first terminal 13 can be suitably secured by making the spring force of the second spring piece 41 assisting the spring force of the first spring piece 26 larger.

This embodiment can be modified and carried out as follows. This embodiment and the following modifications can be carried out in combination without technically contradicting each other.

The number of the first terminals 13 and that of the second terminals 14 are not limited to those in the above embodiment and can be changed as appropriate according to the configuration of the connector 10.

The number of the first divided spring pieces 26*a* in each first spring piece 26 and that of the second divided spring pieces 41*a* in each second spring piece 41 are not limited to those in the above embodiment and can be changed as appropriate according to a dimension in the Y-axis direction of the first terminal 13 or the like. That is, each of the number of the first divided spring pieces 26*a* and that of the second divided spring pieces 41 may be one, three or more.

Although the second spring member 24 is held only on the first spring pieces 26 in the above embodiment, there is no limitation to this. For example, the second spring member 24 may be, for example, configured to be supported also on the second housing 21 and the cover 22 besides the first spring pieces 26.

In the above embodiment, it is also possible to obtain a large contact pressure between the first and second terminals 13, 14 by adding forces of the respective first spring pieces 26 and those of the respective second spring pieces 41.

Although the first spring member 23 of the above embodiment is composed of two components including the first and second components A1, A2, the first spring member 23 may be, for example, composed of one component or three or more components besides the above configuration.

The embodiment disclosed this time should be considered illustrative, rather than restrictive. The scope of the present invention is represented not by the above meaning, but by the scope of claims and is intended to include all changes within the scope of claims and within the meaning and scope of equivalents.

As shown in FIG. 4, in the second terminal 14, the two first divided spring pieces 26*a* of each first spring piece 26 may be, for example, separated in the Y-axis direction across a first slit. The first slit between the two first divided spring pieces 26*a* allows those two first divided spring pieces 26*a* to be individually resiliently deformed. In the second terminal 14, the two second divided spring pieces 41*a* of each second spring piece 41 may be, for example, separated in the Y-axis direction across a second slit. The second slit between the two second divided spring pieces 41*a* allows those two second divided spring pieces 41*a* to be individually resiliently deformed. As shown in FIG. 9, the first slits between the first divided spring pieces 26*a* and the second slits between the second divided spring pieces 41*a* are advantageous in improving a posture variation of the first terminal 13, particularly the contact followability of the first divided spring pieces 26*a* to the first terminal 13 against the rotation or twist of the first terminal 13 about the Z axis. In addition, a force required to resiliently deform the single first divided spring piece 26*a* in the X-axis direction is weaker than a force required to resiliently deform a virtual first spring piece including no first divided spring pieces or no first slit in the X-axis direction. Similarly, a force required to resiliently deform the single second divided spring piece 41*a* in the X-axis direction is weaker than a force required to resiliently deform a virtual second spring piece including no second divided spring pieces or no second slit in the X-axis direction. Therefore, the first divided spring pieces 26*a* separated by the first slits and the second divided spring pieces 41*a* separated by the second slits are advantageous in reducing the insertion force of the first terminal 13 into the second terminal 14.

As shown in FIG. 5, the first spring member 23 may be shaped line-symmetrically with respect to a straight line along the inserting direction D. That is, the pair of first spring pieces 26 may be shaped line-symmetrically with respect to the straight line along the inserting direction D. The second spring member 24 may be shaped line-symmetrically with respect to a straight line along the inserting direction D. That is, the pair of second spring pieces 41 may be shaped line-symmetrically with respect to the straight line along the inserting direction D.

As shown in FIG. 5, the pair of first spring pieces 26 may face each other to sandwich the first terminal 13. The pair of second spring pieces 41 may face each other to sandwich the first terminal 13. That is, the second spring member 24 may sandwich the pair of first spring pieces 26 such that the contact portions 36 of the pair of first spring pieces 26 approach each other. Note that the contact portions 36 may be referred to as electrical contact portions.

As shown in FIG. 3, with the first connector 11 coupled to the second connector 12, i.e. with the first terminals 13 completely inserted in the second terminals 14, gaps extending in the inserting direction D may be present between the tips of the first terminals 13 and the coupling portions 42 of the second spring members 24. That is, with the first connector 11 coupled to the second connector 12, the first terminals 13 may not be in contact with the second spring members 24.

As shown in FIG. 5, the tips of the first spring pieces 26 may project more backward in the inserting direction D than the coupling portion 42. A width between the through holes 46, i.e. an interval along the X axis between the stopper portions 45, in the coupling portion 42 may be larger than the thickness of the first terminal 13.

As shown in FIG. 7, the stopper portions 45 may restrict the amounts of displacement (displacement amounts) of the pair of first spring pieces 26 in the mutually approaching directions. Further, the stopper portions 45 may specify a minimum separation distance between the contact portions 36 of the pair of first spring pieces 26.

As shown in FIG. 8, one of the pair of first spring pieces 26 may contact outer edge parts of the through holes 46 on sides opposite to the stopper portions 45 when being displaced in a separating direction from the other first spring piece 26. In this way, the amount of displacement (displacement amount) of the one of the pair of first spring pieces 26 in the separating direction from the other first spring piece 26 is restricted. That is, the second spring member 24 may include second stopper portions for restricting the displacement amounts of the pair of first spring pieces 26 in the mutually separating directions, and the second stopper portions may be the outer edge parts of the through holes 46. Note that the edge parts of the through holes 46 to be contacted by the pair of first spring pieces 26 when the pair of first spring pieces 26 are displaced in the mutually approaching directions, i.e. the stopper portions 45, may be referred to as inner edge parts, and the stopper portions 45 may be referred to as first stopper portions.

The connector 10, which is a pair of the connected first and second connectors 11, 12, may be referred to as a connector pair.

The present disclosure encompasses the following implementation examples. Reference signs of several constituent elements of the illustrative embodiment are added not for limitation, but for understanding. Some of matters described in the following implementation examples may be omitted or several of the matters described in the implementation examples may be selected or extracted and combined.

Addendum 1

In one aspect of the present disclosure, the stopper portions (45) may be first stopper portions, and the second spring member (24) may further include second stopper portions for restricting displacement amounts of the pair of first spring pieces (26) in the mutually separating directions by contacting the pair of first spring pieces (26).

Addendum 2

In one aspect of the present disclosure, the coupling portion (42) may include the through holes (46) into which the pair of first spring pieces (26) are respectively inserted, and the tips of the first spring pieces (26) may project more backward in the inserting direction (D) of the first terminal (13) than the coupling portion (42).

Addendum 3

In one aspect of the present disclosure, the through holes (46) may have inner edge parts to be contacted by the pair of first spring pieces (26) when the pair of first spring pieces (26) are displaced in the mutually approaching directions and outer edge parts to be contacted by the pair of first spring pieces (26) when the pair of first spring pieces (26) are displaced in the mutually separating directions, the first stopper portions may be the inner edge parts and the second stopper portions may be the outer edge parts.

LIST OF REFERENCE NUMERALS

10 connector
11 first connector
12 second connector
13 first terminal
14 second terminal
15 first housing
16 screw
17 base portion
18 peripheral wall
19 mounting member
21 second housing
22 cover
22*a* opening
23 first spring member
24 second spring member
25 supporting portion
26 first spring piece
26*a* first divided spring piece
27 coupling portion
28 connecting portion
31 first inclined portion
32 second inclined portion
33 bent portion
34 engaging protrusion
35 recess
36 contact portion
37 insertion opening
41 second spring piece
41*a* second divided spring piece
42 coupling portion
43 pressing portion
44 tubular portion
45 stopper portion
46 through hole
A1 first component
A2 second component
D inserting direction
L1 length
L2 length

What is claimed is:

1. A connector, comprising:

a first connector including a first terminal; and a second connector including a second terminal to be connected to the first terminal, the second terminal including a first spring member having a pair of first spring pieces facing each other and a second spring member having a pair of second spring pieces for sandwiching the pair of first spring pieces, the pair of second spring pieces applying pressing forces to the pair of first spring pieces in mutually approaching directions, the first terminal being sandwiched by the pair of first spring pieces, whereby the first terminal and the first spring member are electrically connected, the second spring member including a stopper portion for restricting configured to restrict displacements of the pair of first spring pieces in the mutually approaching directions by contacting the pair of first spring pieces, the second spring member includes a coupling portion coupling the pair of second spring pieces, the coupling portion includes through holes having the stopper portions on edge parts, and the first spring pieces are inserted in the through holes.

2. The connector of claim 1, wherein:

each first spring piece includes a bent portion bent such that the respective first spring pieces are convex in the mutually approaching directions, each first spring piece contacts the first terminal on a convex side of the bent portion, each second spring piece includes a pressing portion to be fit into a concave side of the bent portion, and each pressing portion applies the pressing force to the bent portion.

3. The connector of claim 1, wherein:

the first spring piece includes a plurality of first divided spring pieces, the second spring piece includes a plurality of second divided spring pieces to be respectively brought into contact with the plurality of first divided spring pieces, each first divided spring piece is in contact with the first terminal, and each second divided spring piece applies the pressing force to the first divided spring piece in contact therewith.

4. A connector, comprising:

a first connector including a first terminal; and a second connector including a second terminal to be connected to the first terminal, the second terminal including a first spring member having a pair of first spring pieces facing each other and a second spring member having a pair of second spring pieces for sandwiching the pair of first spring pieces, the pair of second spring pieces applying pressing forces to the pair of first spring pieces in mutually approaching directions, the first terminal being sandwiched by the pair of first spring pieces, whereby the first terminal and the first spring member are electrically connected, the second spring member including a stopper portion for restricting displacements of the pair of first spring pieces in the mutually approaching directions by contacting the pair of first spring pieces, the first spring piece includes a plurality of first divided spring pieces, the second spring piece includes a plurality of second divided spring pieces to be respectively brought into contact with the plurality of first divided spring pieces, each first divided spring piece is in contact with the first terminal, and each second divided spring piece applies the pressing force to the first divided spring piece in contact therewith.

* * * * *